United States Patent
Vignocchi et al.

(10) Patent No.: US 9,922,185 B2
(45) Date of Patent: *Mar. 20, 2018

(54) LINKING TOKEN DETECTION AT A SINGLE COMPUTING PLATFORM WITH A USER IDENTIFICATION TO EFFECTUATE MODIFICATIONS IN VIRTUAL SPACE INSTANCES PRESENTED VIA MULTIPLE COMPUTING PLATFORMS

(71) Applicant: Disney Enterprises, Inc., Burbank, CA (US)

(72) Inventors: John G. Vignocchi, Studio City, CA (US); Robert Nelson, Salt Lake City, UT (US); Jeffrey Bunker, Cedar Hills, UT (US); Troy Leavitt, West Valley City, UT (US); Robert Lowe, Layton, UT (US); John Blackburn, Bountiful, UT (US); Christopher Shen, Holladay, UT (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/513,530

(22) Filed: Oct. 14, 2014

(65) Prior Publication Data

US 2015/0033317 A1    Jan. 29, 2015

Related U.S. Application Data

(63) Continuation of application No. 13/727,424, filed on Dec. 26, 2012, now Pat. No. 8,909,920.

(51) Int. Cl.
*H04L 29/06* (2006.01)
*G06F 21/34* (2013.01)
*G06F 21/00* (2013.01)

(52) U.S. Cl.
CPC .............. *G06F 21/34* (2013.01); *G06F 21/00* (2013.01); *G06F 2221/2109* (2013.01); *G06F 2221/2147* (2013.01)

(58) Field of Classification Search
CPC ........ A63F 2300/553; A63F 2300/5553; A63F 2300/575; G06F 3/04815; G06F 21/6218;
(Continued)

(56) References Cited

U.S. PATENT DOCUMENTS

| 5,190,285 A | 3/1993 | Levy et al. ................. 273/85 G |
| 5,766,077 A | 6/1998 | Hongo ............................ 463/30 |

(Continued)

FOREIGN PATENT DOCUMENTS

| CN | 102308622 | 2/2013 |
| CN | 103902281 | 7/2014 |

(Continued)

OTHER PUBLICATIONS

U.S. Appl. No. 60/151,586, filed Aug. 30, 1999 in the name of Tony Forrest Rodriguez, 4 pages.

(Continued)

*Primary Examiner* — Ali Abyaneh
(74) *Attorney, Agent, or Firm* — Sheppard Mullin Richter & Hampton LLP

(57) ABSTRACT

Token detection at a single computing platform may be linked with a user identification to unlock content and/or effectuate modifications in virtual space instances presented via multiple computing platforms, in accordance with one or more implementations. Exemplary implementations may enhance consistency in a user's experiences of a virtual space across multiple computing platforms.

20 Claims, 3 Drawing Sheets

(58) Field of Classification Search
CPC ....... G06F 21/34; G06F 21/10; H04L 67/306; H04L 63/0853; G07F 7/1008
See application file for complete search history.

(56) References Cited

U.S. PATENT DOCUMENTS

| | | | |
|---|---|---|---|
| 5,807,174 | A | 9/1998 | Fukuhara |
| 5,853,327 | A | 12/1998 | Gilboa ............................. 463/39 |
| 5,855,483 | A | 1/1999 | Collins et al. ................. 434/322 |
| 6,290,565 | B1 | 9/2001 | Galyean, III |
| 6,354,947 | B1 | 3/2002 | Dobrusskin et al. ........... 463/43 |
| 6,361,396 | B1 | 3/2002 | Snyder et al. ................ 446/397 |
| 6,364,735 | B1 | 4/2002 | Bristow et al. ............... 446/397 |
| 6,650,870 | B2 | 11/2003 | White et al. .................... 455/41 |
| 6,735,324 | B1 | 5/2004 | McKinley et al. ............ 382/100 |
| 6,761,637 | B2 | 7/2004 | Weston et al. ................. 463/42 |
| 6,773,325 | B1 | 8/2004 | Mawle et al. ................ 446/175 |
| 6,835,131 | B1 | 12/2004 | White et al. ...................... 463/1 |
| 6,877,096 | B1 | 4/2005 | Chung et al. ................. 713/185 |
| 6,916,679 | B2 | 7/2005 | Snyder |
| 6,967,566 | B2 | 11/2005 | Weston et al. ............ 340/323 R |
| 7,001,276 | B2 | 2/2006 | Shinoda ......................... 463/25 |
| 7,066,781 | B2 | 6/2006 | Weston ......................... 446/268 |
| 7,081,033 | B1 | 7/2006 | Mawle et al. ................ 446/175 |
| 7,244,183 | B1 | 7/2007 | England ......................... 463/48 |
| 7,297,063 | B2 | 11/2007 | Fujisawa et al. .............. 463/43 |
| D559,327 | S | 1/2008 | Luk et al. .................... D21/332 |
| 7,338,377 | B2 | 3/2008 | Shinoda ......................... 463/47 |
| 7,426,642 | B2 | 9/2008 | Aupperle et al. ............. 713/185 |
| 7,488,231 | B2 | 2/2009 | Weston ........................ 446/175 |
| 7,502,759 | B2 | 3/2009 | Hannigan et al. .............. 705/51 |
| 7,534,157 | B2* | 5/2009 | Ganz ................. G06Q 30/0222 446/175 |
| 7,559,834 | B1 | 7/2009 | York |
| 7,636,783 | B2 | 12/2009 | Heutchy et al. .............. 709/227 |
| 7,677,948 | B2 | 3/2010 | Ganz ............................ 446/175 |
| D620,256 | S | 7/2010 | Fujimura et al. ............. D3/294 |
| D620,257 | S | 7/2010 | Fujimura et al. ............. D3/294 |
| 7,789,726 | B2 | 9/2010 | Ganz ............................ 446/175 |
| D626,978 | S | 11/2010 | Huh ............................. D15/126 |
| 7,843,334 | B2 | 11/2010 | Kumagai et al. ........ 340/539.13 |
| 7,843,471 | B2 | 11/2010 | Doan et al. ................... 345/633 |
| 7,846,004 | B2 | 12/2010 | Ganz ............................ 446/175 |
| 7,883,416 | B2 | 2/2011 | Dobrusskin et al. ........... 463/37 |
| 7,883,420 | B2 | 2/2011 | Bradbury et al. .............. 463/43 |
| 7,886,156 | B2 | 2/2011 | Franchi ........................ 713/186 |
| 7,905,779 | B2 | 3/2011 | Dyke et al. .................... 463/30 |
| 7,933,968 | B1* | 4/2011 | Zimmerman ....... H04L 41/0809 709/217 |
| 8,002,605 | B2 | 8/2011 | Ganz ............................ 446/175 |
| D645,910 | S | 9/2011 | Foster et al. ................. D21/333 |
| 8,025,573 | B2 | 9/2011 | Stenton et al. ................. 463/43 |
| D647,426 | S | 10/2011 | Ward .......................... D21/330 |
| 8,033,901 | B2 | 10/2011 | Wood .............................. 463/1 |
| D657,426 | S | 4/2012 | Gomez |
| D666,249 | S | 8/2012 | Minchella Jennings et al. ........................... D21/333 |
| 8,323,068 | B2 | 12/2012 | Ganetakos et al. ........... 446/175 |
| 8,401,913 | B2 | 3/2013 | Alivandi ....................... 705/26.1 |
| D680,594 | S | 4/2013 | Mercier et al. .............. D21/330 |
| D687,106 | S | 7/2013 | Menting ....................... D21/398 |
| 8,521,180 | B2 | 8/2013 | Parish |
| 8,726,172 | B1 | 5/2014 | Vignocchi et al. ........... 715/757 |
| D710,945 | S | 8/2014 | Bilheller et al. ............. D21/333 |
| 8,854,178 | B1 | 10/2014 | Mangold |
| 8,864,589 | B2 | 10/2014 | Reiche, III .................... 463/44 |
| 8,904,298 | B2 | 12/2014 | Nelson et al. ................ 715/757 |
| 8,909,920 | B2 | 12/2014 | Vignocchi et al. ........... 713/159 |
| 8,910,266 | B2 | 12/2014 | Vignocchi et al. ............. 726/9 |
| 8,961,315 | B1 | 2/2015 | Adogla |
| 8,972,369 | B2 | 3/2015 | Vignocchi |
| 8,986,115 | B2 | 3/2015 | Vignocchi |
| 9,092,114 | B2 | 7/2015 | Nelson |
| 2002/0090985 | A1 | 7/2002 | Tochner |
| 2003/0037075 | A1 | 2/2003 | Hannigan et al. ............ 707/500 |
| 2004/0002369 | A1 | 1/2004 | Walker |
| 2004/0029625 | A1 | 2/2004 | Annunziata ...................... 463/1 |
| 2004/0092311 | A1 | 5/2004 | Weston et al. ................. 463/42 |
| 2004/0204212 | A1 | 10/2004 | Sato |
| 2004/0266505 | A1 | 12/2004 | Keam et al. ...................... 463/1 |
| 2005/0245302 | A1 | 11/2005 | Bathiche et al. ................. 463/1 |
| 2006/0009287 | A1 | 1/2006 | Engelfriet ...................... 463/35 |
| 2006/0047825 | A1 | 3/2006 | Steenstra |
| 2006/0063575 | A1 | 3/2006 | Gatto |
| 2006/0094501 | A1 | 5/2006 | O'Leary et al. ................ 463/30 |
| 2006/0148545 | A1 | 7/2006 | Rhyne |
| 2006/0154711 | A1 | 7/2006 | Ellis |
| 2006/0234601 | A1 | 10/2006 | Weston |
| 2007/0015588 | A1 | 1/2007 | Matsumoto et al. ........... 463/43 |
| 2007/0087798 | A1 | 4/2007 | McGucken |
| 2007/0087831 | A1 | 4/2007 | Van Luchene |
| 2007/0087839 | A1 | 4/2007 | Bradbury et al. .............. 463/43 |
| 2007/0197297 | A1 | 8/2007 | Witchey ......................... 463/42 |
| 2007/0207860 | A1 | 9/2007 | Yamauchi |
| 2007/0211047 | A1 | 9/2007 | Doan et al. ................... 345/419 |
| 2007/0218965 | A1 | 9/2007 | Tilston |
| 2008/0085773 | A1 | 4/2008 | Wood ............................. 463/43 |
| 2008/0104018 | A1 | 5/2008 | Xia |
| 2008/0161113 | A1* | 7/2008 | Hansen ................... A63F 13/12 463/42 |
| 2008/0250315 | A1 | 10/2008 | Eronen |
| 2008/0280684 | A1 | 11/2008 | McBride et al. ............... 463/42 |
| 2008/0300053 | A1 | 12/2008 | Muller ........................... 463/31 |
| 2009/0002377 | A1 | 1/2009 | Lee et al. ..................... 345/473 |
| 2009/0005167 | A1 | 1/2009 | Arrasvuori |
| 2009/0023487 | A1 | 1/2009 | Gilson et al. .................. 463/11 |
| 2009/0053970 | A1 | 2/2009 | Borge .......................... 446/268 |
| 2009/0137323 | A1 | 5/2009 | Fiegener et al. ............... 463/43 |
| 2009/0149232 | A1 | 6/2009 | Gosztyla |
| 2009/0170585 | A1 | 7/2009 | Yang |
| 2009/0197658 | A1 | 8/2009 | Polchin .......................... 463/9 |
| 2009/0203446 | A1 | 8/2009 | Bradbury et al. .............. 463/40 |
| 2009/0291764 | A1 | 11/2009 | Kirkman et al. ............... 463/43 |
| 2009/0307611 | A1* | 12/2009 | Riley ....................... A63F 13/12 715/757 |
| 2010/0023492 | A1 | 1/2010 | Lucas ............................ 707/3 |
| 2010/0075761 | A1 | 3/2010 | Lord |
| 2010/0114614 | A1 | 5/2010 | Sharpe |
| 2010/0144429 | A1 | 6/2010 | Ryan |
| 2010/0151940 | A1 | 6/2010 | Borge ........................... 463/29 |
| 2010/0292008 | A1 | 11/2010 | Matsumura |
| 2011/0045913 | A1 | 2/2011 | Walker et al. .................. 463/42 |
| 2011/0107239 | A1 | 5/2011 | Adoni et al. .................. 715/757 |
| 2011/0159963 | A1 | 6/2011 | Link |
| 2011/0165939 | A1 | 7/2011 | Borst |
| 2011/0231781 | A1 | 9/2011 | Betzler et al. ................ 715/757 |
| 2011/0250954 | A1 | 10/2011 | Braund ........................... 463/29 |
| 2011/0263322 | A1 | 10/2011 | Van Luchene .................. 463/29 |
| 2011/0263332 | A1 | 10/2011 | Mizrachi ....................... 463/42 |
| 2011/0264741 | A1 | 10/2011 | Ganetakos |
| 2011/0270751 | A1 | 11/2011 | Csinger |
| 2011/0288914 | A1 | 11/2011 | Guthrie ....................... 705/14.4 |
| 2011/0294574 | A1 | 12/2011 | Yamada et al. ................ 463/30 |
| 2012/0015748 | A1 | 1/2012 | Osada ............................ 463/43 |
| 2012/0019480 | A1 | 1/2012 | Cannon |
| 2012/0064968 | A1 | 3/2012 | Youm et al. .................... 463/29 |
| 2012/0077599 | A1 | 3/2012 | VanLuchene |
| 2012/0142429 | A1 | 6/2012 | Muller ........................... 463/42 |
| 2012/0172131 | A1 | 7/2012 | Boswell et al. ................ 463/42 |
| 2012/0238362 | A1 | 9/2012 | Janis et al. ..................... 463/31 |
| 2012/0252570 | A1 | 10/2012 | Kwant |
| 2012/0295702 | A1 | 11/2012 | Otero et al. .................... 463/31 |
| 2012/0295703 | A1* | 11/2012 | Reiche ................... A63F 13/235 463/31 |
| 2012/0295704 | A1 | 11/2012 | Reiche et al. .................. 463/31 |
| 2012/0302356 | A1 | 11/2012 | Annunziata .................... 463/42 |
| 2012/0311688 | A1 | 12/2012 | Lemus et al. .................... 726/8 |
| 2012/0315983 | A1 | 12/2012 | Miller, IV et al. ............. 463/29 |
| 2012/0331529 | A1 | 12/2012 | Ibel et al. ........................ 726/4 |
| 2013/0017891 | A1 | 1/2013 | Romero |
| 2013/0040654 | A1 | 2/2013 | Parish |
| 2013/0069305 | A1 | 3/2013 | Lee |
| 2013/0079132 | A1* | 3/2013 | Archer ..................... A63F 13/79 463/31 |

(56) References Cited

U.S. PATENT DOCUMENTS

| | | | |
|---|---|---|---|
| 2013/0086114 A1* | 4/2013 | Wilson | G06F 17/30575 707/783 |
| 2013/0290137 A1 | 10/2013 | Olomskiy | 405/26.41 |
| 2013/0290147 A1 | 10/2013 | Chandra et al. | 705/27.1 |
| 2013/0296043 A1 | 11/2013 | Weinshanker et al. | 463/30 |
| 2014/0066209 A1 | 3/2014 | Annambhotla | 463/42 |
| 2014/0176534 A1 | 6/2014 | Vignocchi et al. | 345/419 |
| 2014/0179418 A1 | 6/2014 | Vignocchi et al. | 463/29 |
| 2014/0179443 A1 | 6/2014 | Vignocchi et al. | 463/43 |
| 2014/0179444 A1 | 6/2014 | Vignocchi et al. | 463/43 |
| 2014/0179446 A1* | 6/2014 | Zuniga | A63F 9/24 463/47 |
| 2014/0181062 A1 | 6/2014 | Vignocchi et al. | 707/705 |
| 2014/0181507 A1 | 6/2014 | Vignocchi et al. | 713/159 |
| 2014/0181706 A1 | 6/2014 | Vignocchi | 715/764 |
| 2014/0181820 A1 | 6/2014 | Vignocchi et al. | 718/100 |
| 2014/0181994 A1 | 6/2014 | Vignocchi et al. | 726/28 |
| 2014/0223534 A1 | 8/2014 | Vignocchi et al. | 726/9 |
| 2014/0304624 A1 | 10/2014 | Nelson et al. | 715/757 |
| 2015/0033154 A1 | 1/2015 | Nelson | |
| 2015/0033317 A1 | 1/2015 | Vignocchi | |
| 2015/0134658 A1 | 5/2015 | Vignocchi | |
| 2015/0294508 A1 | 10/2015 | Nelson | |

FOREIGN PATENT DOCUMENTS

| | | |
|---|---|---|
| CN | 101868800 | 3/2015 |
| EP | 2749332 | 7/2014 |
| GB | 2 365 364 | 2/2002 |
| WO | WO 01/69572 | 9/2001 |
| WO | WO 01/69830 | 9/2001 |
| WO | WO 03/043709 | 5/2003 |
| WO | 2007101785 | 9/2007 |
| WO | WO 2007/101785 | 9/2007 |

OTHER PUBLICATIONS

U.S. Appl. No. 60/288,272, filed May 2, 2001 in the name of Ravi K. Sharma et al., 31 pages.

U.S. Appl. No. 60/297,229, filed Jun. 7, 2001 in the name of Brett T. Hannigan et al., 46 pages.

U.S. Appl. No. 60/335,908, filed Nov. 14, 2001 in the name of Stephen C. Beck, 120 pages.

U.S. Appl. No. 60/355,856, filed Feb. 10, 2002 in the name of Brett T. Hannigan et al., 53 pages.

Varney, Allen et aL, "Paranoia XP", Mongoose Publishing, Dec. 31, 2004, ISBN: 978-1-904854-26-5, retrieved from the Internet: URL:http://fc09.deviantart.net/fs71/f/2012/316/e/6/paranoia_player_section_by_atta_crossroads-d4zxv52.pdf, retrieved Apr. 16, 2014, 110 pages.

Diablo III, Wikipedia.org, online, accessed via the Internet, accessed Jun. 26, 2014, URL: <http://en.wikipedia.org/wiki/Diablo_III>, 25 pages.

Stash, Diablowiki.net, online, accessed via the Internet, accessed Jun. 26, 2014, URL: <http://www.diablowiki.net/Stash>, 7 pages.

Gear Sets, Diablowiki.net, online, accessed via the Internet, accessed Jun. 26, 2014, URL: <http://www.diablowiki.net/Gear_sets>, 8 pages.

Weapons, Diablowiki.net, online, accessed via the Internet, accessed Jun. 26, 2014, URL: <http://www.diablowiki.net/Weapons>, 7 pages.

Fundamentals, Battle.net, online, accessed via the Internet, accessed Jun. 26, 2014, URL: <http://us.battle.net/d3/en/game/guide/gameplay/fundamentals>, 13 pages.

Inventory, Battlet.net, online, accessed via the Internet, accessed Jun. 26, 2014, URL: <http://us.battle.net/d3/en/game/guide/items/inventory>, 9 pages.

Toy Story 3: The Video Game, Wikipedia.org, online, accessed via the Internet, accessed Jun. 26, 2014, URL: <http://en.wikipedia.org/wiki/Toy_Story_3:_The_Video_Game>, 10 pages.

Toy Story 3 Toy Box Mode Demo, Youtube.com, online, May 8, 2010, accessed via the Internet, accessed Jun. 26, 2014, URL: <http://www.youtube.com/watch?v=Do84qnpfUvQ>, 2 pages.

Crecente, Brian, "Diving Into Toy Story 3's Toy Box", Kotaku.com, online, May 20, 2010, accessed via the Internet, accessed Jun. 26, 2014, URL: <http://kotaku.com/5543513/diving-into-toy-story-3s-toy-box>, 4 pages.

Whitehead, Dan, "Toy Story 3 Page 2", Eurogamer.net, online, Jul. 14, 2010, accessed via the Internet, accessed Jun. 26, 2014, URL: <http://www.eurogamer.net/articles/toy-story-3-review?page=2>, 2 pages.

Barnett, Emma; "New App Automates Foursquare 'Check-Ins'", The Telegraph, Aug. 3, 2010, as published at http://www.telegraph.co.uk/technology/news/7924803/New-app-automates-four-square-check-ins.html. (4 pages).

Lapenna, Joe; "Check in With Google Latitude," Google Mobile Blog, Feb. 1, 2011, as published at http://www.googlemobile.blogspot.com/2011/02/check-in-with-google-latitude.html. (12 pages).

Paul et al., "Adaptive Storytelling and Story Repair in a Dynamic Environment" 2011, Springer-Verlag Berlin Heidelberg, pp. 128-139.

[Guide] Item Drops That Starts Quest [LvL 1-85 Zones]. Eu.battle.net. Online. Dec. 31, 2010. Accessed via the Internet. Accessed Nov. 13, 2014. <URL:http://eu.battle.net/wow/en/forum/topic/1415204550>, 18 pages.

Blood Elf Plans. Eu.battle.net. Online. Accessed via the Internet. Accessed Nov. 13, 2014. <URL:http://eu.battle.net/wow/en/item/24414>, 2 pages.

"The Legend of Zelda: Phantom Hourglass—Instruction Booklet", Jan. 1, 2007, XP002582478, retrieved from the Internet: URL:http://www.nintendo.com/consumer/gameslist/manuals/DS_Zelda_Phantom_Hourglass.pdf [retrieved on Jun. 1, 2010], pp. 1-18.

Anonymous, "Auction House/Barter House", Path of Exile—Forum, Retrieved from the Internet: URL: https://www.pathofexile.com/forum/view-thread/29205 [retrieved on Oct. 13, 2015], Apr. 25, 2012 (Apr. 25, 2012), XP055220590, 9 pages.

Anonymous, "Trade", WoWWiki—Your Guide to the World of Warcraft and Its Universe, Retrieved from the Interent: URL: http://wowwiki.wikia.com/wiki/Trade [retrieved on Oct. 13, 2015], Dec. 18, 2012 (Dec. 18, 2012), XP055220546, 3 pages.

European Examination Report issued in European Patent Application No. 13199483.2, dated Nov. 10, 2015, 7 pages.

"Super Mario Galaxy—Super Mario Wiki, the Mario Encyclopedia", Dec. 20, 2012, URL:http://www.mariowiki.com/index.php?title=Super_Mario_Galaxy&oldid=1378528 [retrieved on Jun. 22, 2016].

\* cited by examiner

LINKING TOKEN DETECTION AT A SINGLE COMPUTING PLATFORM WITH A USER IDENTIFICATION TO EFFECTUATE MODIFICATIONS IN VIRTUAL SPACE INSTANCES PRESENTED VIA MULTIPLE COMPUTING PLATFORMS

CROSS REFERENCE TO RELATED APPLICATIONS

The present application is a continuation of U.S. patent application Ser. No. 13/727,424, filed Dec. 26, 2012, entitled "Linking Token Detection At A Single Computing Platform With A User Identification To Effectuate Modifications In Virtual Space Instances Presented Via Multiple Computing Platforms", the disclosure of which is incorporated herein by reference in its entirety.

FIELD OF THE DISCLOSURE

This disclosure relates to linking token detection at a single computing platform with a user identification to effectuate modifications in virtual space instances presented via multiple computing platforms.

BACKGROUND

Conventionally, unlocking content and/or effectuating modifications in a virtual space may be limited to a single instance of the virtual space configured for presentation via a specific type of computing platform. As such, a user's experience may be inconsistent when the user accesses different instances of the virtual space via different types of computing platforms. For example, certain unlocked content and/or modifications may be realized in an instance of the virtual space presented via a game console, but not in an instance of the virtual space presented via a mobile device.

SUMMARY

One aspect of the disclosure relates to a system configured to link token detection at a single computing platform with a user identification to unlock content and/or effectuate modifications in virtual space instances presented via multiple computing platforms, in accordance with one or more implementations. Exemplary implementations may enhance consistency in a user's experiences of a virtual space across multiple computing platforms. By way of non-limiting example, a physical token may be detected at a stationary computing platform to unlock content and/or effectuate modifications in an instance of the virtual space presented via the stationary computing platform. The detection of the token may be linked to a user identification (user ID) of the user such that, when the user accesses a different instance of the virtual space via a mobile computing platform using his user ID, the unlocked content and/or modifications are realized in the instance presented via the mobile computing platform. A given token may be a standalone physical object. In some implementations, the given token may be configured to depict a given character and/or a given virtual item.

The system may include one or more virtual space platforms. The virtual space platform(s) may be configured to execute one or more computer program modules. The computer program modules may include one or more of a user module, a space module, a token detection module, a user ID linking module, a content unlocking module, a space modification module, a virtual item repository module, and/or other modules. The user module may be configured to access and/or manage one or more user identifications, user profiles, and/or user information associated with users of the system. The space module may be configured to implement one or more instances of the virtual space executed by the computer modules to determine views of the virtual space.

The token detection module may be configured to detect tokens based on signals received from a token reader. A given token may be a standalone physical object. The given token may be associated with a given character and/or a given virtual item. The given virtual item may be associated with the given character. In some implementations, the given virtual item may be associated with the given character based on a theme shared by the given virtual item and the given character. Examples of the given token may include one or more of a toy figurine, a toy accessory, a coin, and/or other form factors suitable to be tokens as described herein. Individual tokens may be configured to be detectable by token reader. The token reader may be configured to provide signals associated with individual tokens.

The user ID linking module may be configured to associate detection of individual tokens with individual user identifications. For example, detection of a first token may be associated with a first user identification responsive to a first signal being received from a token reader communicatively coupled with a first computing platform with which the first user accesses an instance of the virtual space. In some implementations, a user profile may be modified to indicate that one or more tokens have been detected in connection with the corresponding user.

The content unlocking module may be configured to unlock content in the virtual space responsive to individual tokens being detected. The content may include one or more of a character, a virtual item, and/or other content. Previously locked content may become accessible in the virtual space responsive to being unlocked. That is, until certain content is unlocked, it may not be accessible and/or available in the virtual space. The content may include first content configured to be unlocked responsive to the association between the detection of the first token and the first user identification. The unlocked first content may be accessible in both the first instance via the first computing platform as well as a second instance of the virtual space via a second computing platform. According to some implementations, where the instances of the virtual space further include a third instance associated with the first user identification, the third instance being configured for presentation via a third computing platform, the unlocked first content may be accessible in the third instance via the third computing platform.

According to some implementations, the content unlocking module may be configured to unlock content responsive to a performance of one or more game mechanisms associated with the virtual space in conjunction with token detection. A game mechanism may include an action, a mission, a quest, a task, and/or other game mechanism. In some implementations, unlocking certain content may require both a given token being detected and a given game mechanism being performed.

In some implementations, certain content may be unlocked responsive to two or more tokens (e.g., a first token and a second token) being detected. The two or more tokens may be detected by the same token reader and/or by token readers associated with different virtual space platforms. The content may embody a combination of content associated with the two or more detected tokens.

The space modification module may be configured to effectuate modifications in the virtual space responsive to individual tokens being detected. The modifications may include one or more of a modification to a character, a modification to a virtual item, a modification to one or more aspects of the virtual space, and/or other modifications. The modification to the character may include a modification to one or more of a behavior of the character, an ability of the character, an appearance of the character, a relationship of the character, and/or other modifications to the character. The modification to the virtual item may include a modification to one or more of a function of the virtual item, an effectiveness of the virtual item, an appearance of the virtual item, and/or other modifications of the virtual item.

The one or more aspects of the virtual space may include one or more of objectives associated with the virtual space, an environment of the virtual space, a theme of the virtual space, and/or other aspects of the virtual space. Generally speaking, a given objective may be a purpose or goal that efforts or actions within the virtual space are intended to attain or accomplish. By way of non-limiting example, an objective may include a set of actions that must be performed by a user character in order to advance to a next level of gameplay in the virtual space.

The environment may be an aggregate of surroundings and conditions of the virtual space. By way on non-limiting example, the surroundings of the virtual space may include one or more of the appearance of the virtual space, a color scheme of the virtual space, a sound and/or soundtrack associated with the virtual space, and/or other aspects of the surroundings of the virtual space. The conditions of the virtual space may include one or more of laws of nature (e.g., gravity) of the virtual space, weather depicted in the virtual space, and/or other aspects of the conditions of the virtual space. Modifying the environment may include modifying one or both of the surroundings or the conditions of the virtual space.

The theme of the virtual space may be a unifying subject associated with the virtual space. A given character may be one of a given plurality of characters associated with a given theme. Modifying the theme of the virtual space based on the given theme may include incorporating one or more attributes of the given theme in the theme of the virtual space. Examples of such attributes may include one or more of objects, designs, symbols, color schemes, music, and/or other attributes that identify a given theme.

The modifications may include a first modification configured to be made responsive to the association between the detection of the first token and the first user identification. The first modification may be observable in both the first instance via the first computing platform and the second instance via the second computing platform. According to some implementations, where the instances of the virtual space further include a third instance associated with the first user identification, the third instance being configured for presentation via a third computing platform, the first modification may be observable in the third instance via the third computing platform.

The virtual item repository module may be configured to provide a virtual item repository within the virtual space. The virtual item repository may be configured to facilitate access by a plurality of characters to a plurality of virtual items. The plurality of characters may include the first character and the plurality of virtual items may include the first virtual item. The first virtual item may be accessible via the virtual item repository in both the first instance via the first computing platform and the second instance via the second computing platform. Where the plurality of characters includes a second character, the first virtual item may be accessible to the second character via the virtual item repository.

In some implementations, the virtual item repository may be visually represented at a location within one or more instances of the virtual space. By way of non-limiting example, the virtual item repository may be visually represented as a toy box within the virtual space. In some implementations, a given character may be required to be located proximally with the visual representation of the virtual item repository in order to access individual ones of the plurality of virtual items. For example, the given character may be required to stand next to, enter, and/or otherwise be located proximally with the visual representation of the virtual item repository in order to access a given virtual item.

According to some implementations, individual ones of the plurality of virtual items made accessible by the virtual item repository may be accessible to a given character via an inventory associated with the given character. The inventory may be accessible via a menu and/or other interface associated with the virtual space.

Accessibility of virtual items via the virtual item repository may vary according to different implementations. In some implementations, the virtual item repository may be configured such that a given virtual item is accessed by two or more characters at a given time. In some implementations, the virtual item repository may be configured such that a given virtual item is accessed by one single character at a given time. The one single character may be required to relinquish the given virtual item in order for the given virtual item to be accessed by another character.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
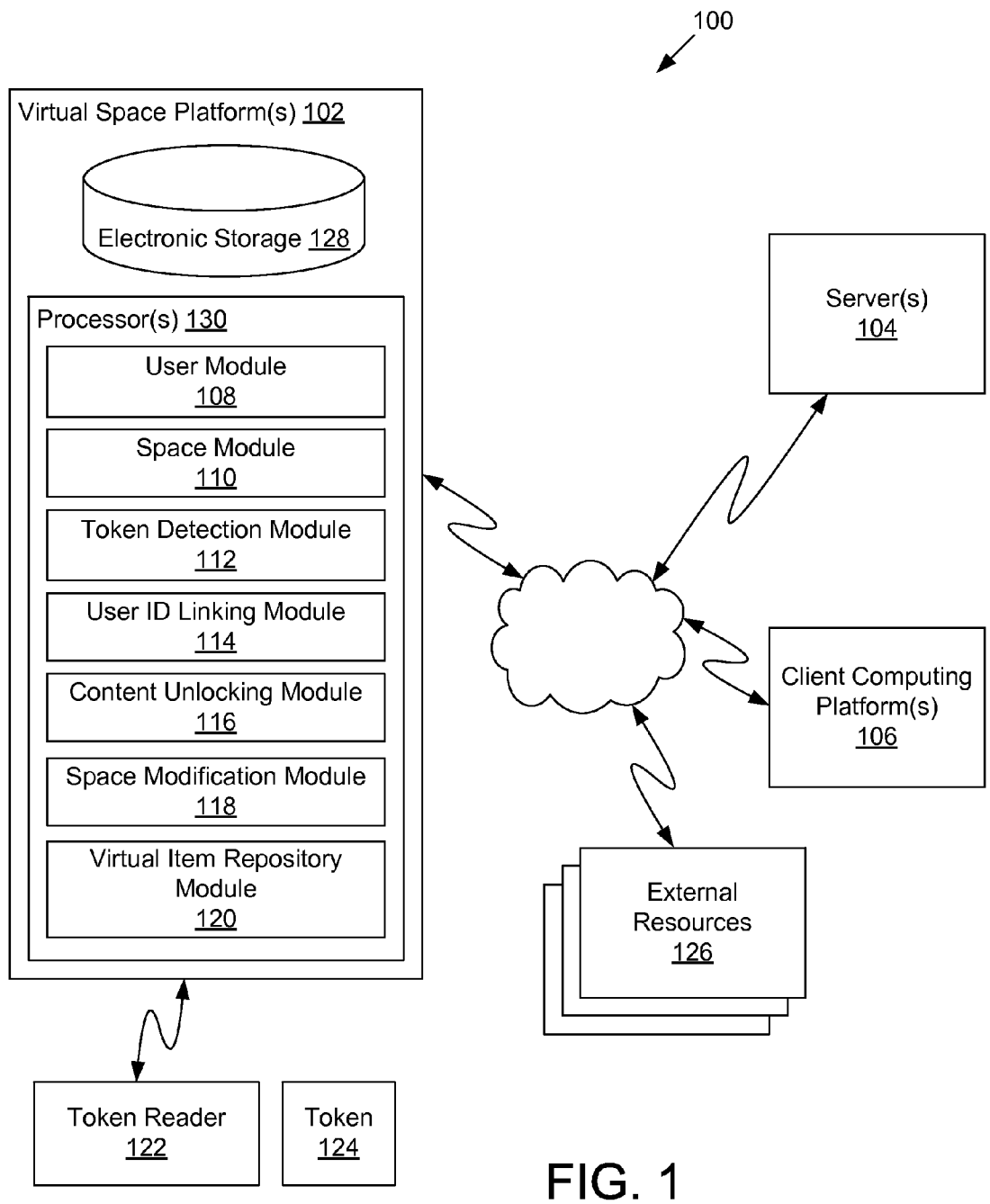
FIG. 1 illustrates a system configured to link token detection at a single computing platform with a user identification to unlock content and/or effectuate modifications in virtual space instances presented via multiple computing platforms, in accordance with one or more implementations.

FIG. 1 illustrates a system 100 configured to link token detection at a single computing platform with a user identification to unlock content and/or effectuate modifications in virtual space instances presented via multiple computing platforms, in accordance with one or more implementations. Exemplary implementations may enhance consistency in a user's experiences of a virtual space across multiple computing platforms. By way of non-limiting example, a physical token may be detected at a stationary computing platform to unlock content and/or effectuate modifications in an instance of the virtual space presented via the stationary computing platform. The detection of the token may be linked to a user identification (user ID) of the user such that, when the user accesses a different instance of the virtual space via a mobile computing platform using his user ID, the unlocked content and/or modifications are realized in the instance presented via the mobile computing platform.

A given token may be a standalone physical object. In some implementations, the given token may be configured to depict a given character and/or a given virtual item. By way of non-limiting example, the given character may be Captain Jack Sparrow, the fictional character and protagonist of the Pirates of the Caribbean film series. The given virtual item may be an accessory associated with Captain Jack Sparrow, such as a sword. The given token may be a toy figurine embodying the appearance of Captain Jack Sparrow and/or the sword.

The system 100 may include one or more virtual space platforms 102. In some implementations, virtual space platform(s) 102 may be one or more servers (e.g., server(s) 104) configured to communicate with one or more client computing platform (e.g., client computing platforms 106) according to a client/server architecture. According to some implementations, virtual space platform(s) 102 may be one or more client computing platforms (e.g., client computing platforms 106). In some implementations, virtual space platform(s) 102 may communicate with other virtual space platform(s) 102 according to a peer-to-peer architecture. The users may access system 100 and/or the virtual space via the virtual space platform(s) 102 and/or client computing platform(s) 106.

The virtual space platform(s) 102 may be configured to execute one or more computer program modules. The computer program modules may include one or more of a user module 108, a space module 110, a token detection module 112, a user ID linking module 114, a content unlocking module 116, a space modification module 118, a virtual item repository module 120, and/or other modules.

The user module 108 may be configured to access and/or manage one or more user identifications, user profiles, and/or user information associated with users of system 100. The one or more one or more user identifications, user profiles, and/or user information may include information stored by virtual space platform(s) 102 and/or other storage locations. The one or more user identifications, user profiles, and/or user information may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The space module 110 may be configured to implement one or more instances of the virtual space executed by the computer modules to determine views of the virtual space. In some implementations, the views may then be communicated (e.g., via streaming, via object/position data, and/or other information) from server(s) 104 to client computing platform(s) 106 for presentation to users. The one or more instances of the virtual space may include a first instance and a second instance. Both the first instance and the second instance may be associated with a single user identification. The first instance may be configured for presentation via a first computing platform (e.g., a first client computing platform 106) and the second instance may be configured for presentation via a second computing platform (e.g., a second client computing platform 106). The view determined and presented to a given user may correspond to a user character being controlled by the given user. The view determined and presented to the given user may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via virtual space platform(s) 102 and/or clients (e.g., client computing platform(s) 106) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined by space module 110 is not intended to be limiting. The space module 110 may be configured to express the virtual space in a more limited, or richer, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 110, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through virtual space platform(s) 102 and/or clients (e.g., client computing platform(s) 106). The users may interact with each other through communications exchanged within the virtual space. Such communications may include one or more of textual chat, instant messages, private messages, voice communications, and/or other communications. Communications may be received and entered by the users via their respective virtual space platform(s) 102 and/or client(s) (e.g., client computing platform(s) 106). Communications may be routed to and from the appropriate users through virtual space platform(s) 102 (e.g., through space module 110).

The token detection module 112 may be configured to detect tokens based on signals received from a token reader 122. A given token (e.g., token 124) may be a standalone physical object. The given token may be associated with a given character and/or a given virtual item. The given virtual item may be associated with the given character. In some implementations, the given virtual item may be associated with the given character based on a theme shared by the given virtual item and the given character. By way of non-limiting example, the given character may be Buzz Lightyear, the fictional character and deuteragonist of the Toy Story film series. The given virtual item may be the handheld "Blaster" used by Buzz Lightyear in the Toy Story film series. The character Buzz Lightyear and the virtual item Blaster share the theme of the Toy Story film series. In some implementations, the given token may be configured to depict the given character and/or the given virtual item. Examples of the given token may include one or more of a toy figurine, a toy accessory, a coin, and/or other form factors suitable to be tokens as described herein.

Individual tokens may be configured to be detectable by token reader 122. In some implementations, detection of a given token may be based on a shape of a portion of the given token. In some implementations, a given token may be detectable based on a given signal conveying information associated with the given token. Detection of a given token may be facilitated by electronics embedded within or otherwise included in the given token. For example, the given token may include a radio-frequency identification (RFID) chip configured to emit radio-frequency electromagnetic fields responsive to the given token being disposed in a proximity of token reader 122. As another example, the given token may include an integrated circuit configured to transfer information associated with the given token responsive to the given token being placed in contact with a portion of token reader 122.

According to some implementations, virtual space content associated with virtual items and/or other virtual space content may be stored at a location other than one or more of the tokens. That is, a given token may not store virtual space content. A given token may store information used to detect the given token. A given token may not store information other than what may be used to detect the given token. Virtual space content may be information used by space module 110 to affect views and/or gameplay of the virtual space. Such virtual space content may be stored by the virtual space platform(s) and/or by one or more other components of system 100.

The token reader 122 may be configured to provide signals associated with individual tokens. For example, a given signal associated with a given token may convey information associated with the given token. In some implementations, token reader 122 may be configured to provide a first signal responsive to one or more of (1) a first token abutting a portion of the token reader, (2) the first token being disposed in a proximity of the token reader, and/or other actions configured to facilitate detection of the first token. According to some implementations, token reader 122 may be a peripheral device configured to be communicatively coupled with one or more components of system 100. In some implementations, token reader 122 may be integrated so as to form a singular device with a component of system 100 (e.g., a given virtual space platform 102). According to some implementations, one or more of the client computing platform(s) 106 may be communicatively coupled with a token reader 122, while one or more of the client computing platform(s) 106 may not be communicatively coupled with and/or otherwise associated with a token reader 122. For example, a stationary client computing platform may have an integrated token reader, while a mobile client computing platform may not have a token reader associated therewith.

The user ID linking module 114 may be configured to associate detection of individual tokens with individual user identifications. For example, detection of a first token may be associated with a first user identification responsive to a first signal being received from a token reader 122 communicatively coupled with a first computing platform (e.g., a client computing platform 106) with which the first user accesses an instance of the virtual space. In some implementations, a user profile may be modified to indicate that one or more tokens have been detected in connection with the corresponding user.

The content unlocking module 116 may be configured to unlock content in the virtual space responsive to individual tokens being detected. The content may include one or more of a character, a virtual item, and/or other content. Previously locked content may become accessible in the virtual space responsive to being unlocked. That is, until certain content is unlocked, it may not be accessible and/or available in the virtual space. The content may include first content configured to be unlocked responsive to the association between the detection of the first token and the first user identification. The unlocked first content may be accessible in both the first instance via the first computing platform as well as a second instance of the virtual space via a second computing platform (e.g., a second client computing platform 106). According to some implementations, where the instances of the virtual space further include a third instance associated with the first user identification, the third instance being configured for presentation via a third computing platform (e.g., a third client computing platform 106), the unlocked first content may be accessible in the third instance via the third computing platform.

According to some implementations, content unlocking module 116 may be configured to unlock content responsive to a performance of one or more game mechanisms associated with the virtual space in conjunction with token detection. A game mechanism may include an action, a mission, a quest, a task, and/or other game mechanism. In some implementations, unlocking certain content may require both a given token being detected and a given game mechanism being performed.

In some implementations, certain content may be unlocked responsive to two or more tokens (e.g., a first token and a second token) being detected. The two or more tokens may be detected by the same token reader 122 and/or by token readers 122 associated with different virtual space platforms 102. The content may embody a combination of content associated with the two or more detected tokens. By way of non-limiting example, the content unlocked responsive to two or more tokens being detected may include an accessory that combines certain features of the sword and the Blaster.

The space modification module 118 may be configured to effectuate modifications in the virtual space responsive to individual tokens being detected. The modifications may include one or more of a modification to a character, a modification to a virtual item, a modification to one or more aspects of the virtual space, and/or other modifications. The modification to the character may include a modification to one or more of a behavior of the character, an ability of the character, an appearance of the character, a relationship of the character, and/or other modifications to the character. The modification to the virtual item may include a modification to one or more of a function of the virtual item, an effectiveness of the virtual item, an appearance of the virtual item, and/or other modifications to the virtual item.

The one or more aspects of the virtual space may include one or more of objectives associated with the virtual space, an environment of the virtual space, a theme of the virtual space, and/or other aspects of the virtual space. Generally speaking, a given objective may be a purpose or goal that efforts or actions within the virtual space are intended to attain or accomplish. By way of non-limiting example, an objective may include a set of actions that must be performed by a user character in order to advance to a next level of gameplay in the virtual space.

The environment may be an aggregate of surroundings and conditions of the virtual space. By way on non-limiting example, the surroundings of the virtual space may include one or more of the appearance of the virtual space, a color scheme of the virtual space, a sound and/or soundtrack associated with the virtual space, and/or other aspects of the surroundings of the virtual space. The conditions of the virtual space may include one or more of laws of nature (e.g., gravity) of the virtual space, weather depicted in the virtual space, and/or other aspects of the conditions of the virtual space. Modifying the environment may include modifying one or both of the surroundings or the conditions of the virtual space.

The theme of the virtual space may be a unifying subject associated with the virtual space. A given character may be one of a given plurality of characters associated with a given theme. By way of non-limiting example, where the first character is Captain Jack Sparrow and the second character is Buzz Lightyear, the first theme may relate to Pirates of the Caribbean and the second theme may relate to Toy Story. Modifying the theme of the virtual space based on the given theme may include incorporating one or more attributes of the given theme in the theme of the virtual space. Examples of such attributes may include one or more of objects, designs, symbols, color schemes, music, and/or other attributes that identify a given theme.

The modifications may include a first modification configured to be made responsive to the association between the detection of the first token and the first user identification. The first modification may be observable in both the first instance via the first computing platform and the second instance via the second computing platform. According to some implementations, where the instances of the virtual space further include a third instance associated with the first user identification, the third instance being configured for presentation via a third computing platform (e.g., a third computing platform 106), the first modification may be observable in the third instance via the third computing platform.

The virtual item repository module 120 may be configured to provide a virtual item repository within the virtual space. The virtual item repository may be configured to facilitate access by a plurality of characters to a plurality of virtual items. The plurality of characters may include the first character and the plurality of virtual items may include the first virtual item. The first virtual item may be accessible via the virtual item repository in both the first instance via the first computing platform and the second instance via the second computing platform. Where the plurality of characters includes a second character, the first virtual item may be accessible to the second character via the virtual item repository.

In some implementations, the virtual item repository may be visually represented at a location within one or more instances of the virtual space. By way of non-limiting example, the virtual item repository may be visually represented as a toy box within the virtual space. In some implementations, a given character may be required to be located proximally with the visual representation of the virtual item repository in order to access individual ones of the plurality of virtual items. For example, the given character may be required to stand next to, enter, and/or otherwise be located proximally with the visual representation of the virtual item repository in order to access a given virtual item.

According to some implementations, individual ones of the plurality of virtual items made accessible by the virtual item repository may be accessible to a given character via an inventory associated with the given character. The inventory may be accessible via a menu and/or other interface associated with the virtual space.

Accessibility of virtual items via the virtual item repository may vary according to different implementations. In some implementations, the virtual item repository may be configured such that a given virtual item is accessed by two or more characters at a given time. In some implementations, the virtual item repository may be configured such that a given virtual item is accessed by one single character at a given time. The one single character may be required to relinquish the given virtual item in order for the given virtual item to be accessed by another character.

In some implementations, two or more components of system 100 (e.g., virtual space platform(s) 102, server(s) 104, client computing platform(s) 106, token reader 122, and/or external resources 126) may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which two or more components of system 100 may be operatively linked via some other communication media.

A given server 104 may include one or more processors configured to execute computer program modules. The computer program modules may be configured to enable an expert or user associated with the given server 104 to interface with system 100 and/or external resources 126, and/or provide other functionality attributed herein to server(s) 104.

A given client computing platform 106 may include one or more processors configured to execute computer program modules. The computer program modules may be configured to enable an expert or user associated with the given client computing platform 106 to interface with system 100 and/or external resources 126, and/or provide other functionality attributed herein to client computing platform(s) 106. By way of non-limiting example, the given client computing platform 106 may include one or more of a desktop computer, a laptop computer, a handheld computer, a NetBook, a Smartphone, a gaming console, and/or other computing platforms.

The external resources 126 may include sources of information, hosts and/or providers of virtual environments outside of system 100, external entities participating with system 100, and/or other resources. In some implementations, some or all of the functionality attributed herein to external resources 126 may be provided by resources included in system 100.

The virtual space platform(s) 102 may include electronic storage 128, one or more processors 130, and/or other components. The virtual space platform(s) 102 may include communication lines, or ports to enable the exchange of information with a network and/or other computing platforms. Illustration of virtual space platform(s) 102 in FIG. 1 is not intended to be limiting. The virtual space platform(s) 102 may include a plurality of hardware, software, and/or firmware components operating together to provide the functionality attributed herein to virtual space platform(s) 102. For example, virtual space platform(s) 102 may be implemented by a cloud of computing platforms operating together as virtual space platform(s) 102.

Electronic storage 128 may comprise electronic storage media that electronically stores information. The electronic storage media of electronic storage 128 may include one or both of system storage that is provided integrally (i.e., substantially non-removable) with virtual space platform(s) 102 and/or removable storage that is removably connectable to virtual space platform(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 128 may include one or more virtual storage resources (e.g., cloud storage, a virtual private network, and/or other virtual storage resources). Electronic storage 128 may store software algorithms, information determined by processor(s) 130, information received from one or more other components of system 100, and/or other information that enables virtual space platform(s) 102 to function as described herein.

The processor(s) 130 may be configured to provide information processing capabilities in virtual space platform(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. The processor(s) 130 may be configured to execute modules 108, 110, 112, 114, 116, 118, 120, and/or other modules. The processor(s) 130 may be configured to execute modules 108, 110, 112, 114, 116, 118, 120, and/or other modules by software; hardware; firmware; some combination of software, hardware, and/or firmware; and/or other mechanisms for configuring processing capabilities on processor(s) 130.

It should be appreciated that although modules 108, 110, 112, 114, 116, 118, and 120 are illustrated in FIG. 1 as being co-located within a single processing unit, in implementations in which processor(s) 130 includes multiple processing units, one or more of modules 108, 110, 112, 114, 116, 118, and/or 120 may be located remotely from the other modules. The description of the functionality provided by the different modules 108, 110, 112, 114, 116, 118, and/or 120 described herein is for illustrative purposes, and is not intended to be limiting, as any of modules 108, 110, 112, 114, 116, 118, and/or 120 may provide more or less functionality than is described. For example, one or more of modules 108, 110, 112, 114, 116, 118, and/or 120 may be eliminated, and some or all of its functionality may be provided by other ones of modules 108, 110, 112, 114, 116, 118, and/or 120. As another example, processor(s) 130 may be configured to execute one or more additional modules that may perform some or all of the functionality attributed below to one of modules 108, 110, 112, 114, 116, 118, and/or 120.

Figure 2:
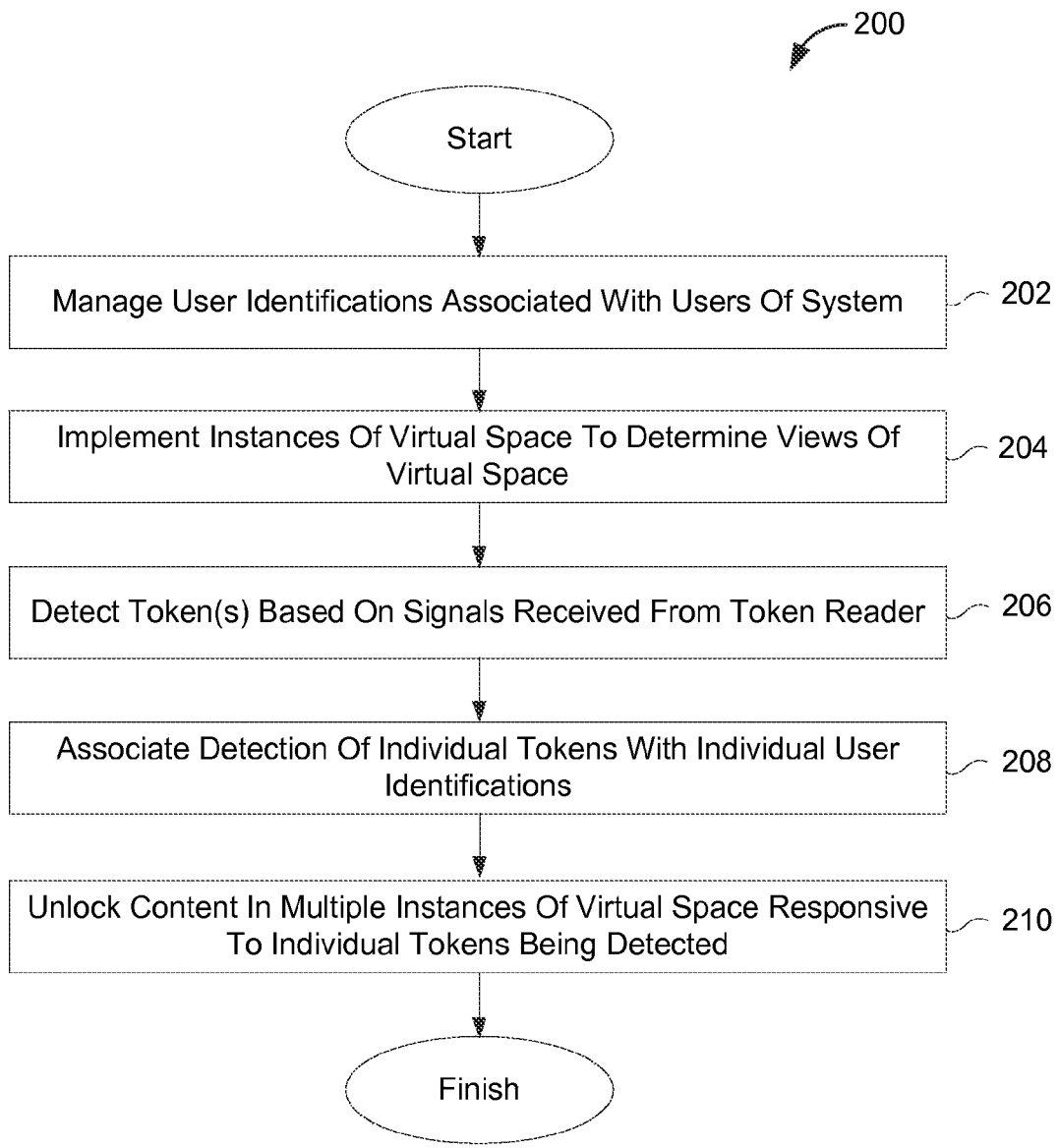
FIG. 2 illustrates a method for linking token detection at a single computing platform with a user identification to unlock content in virtual space instances presented via multiple computing platforms, in accordance with one or more implementations.
Figure 3:
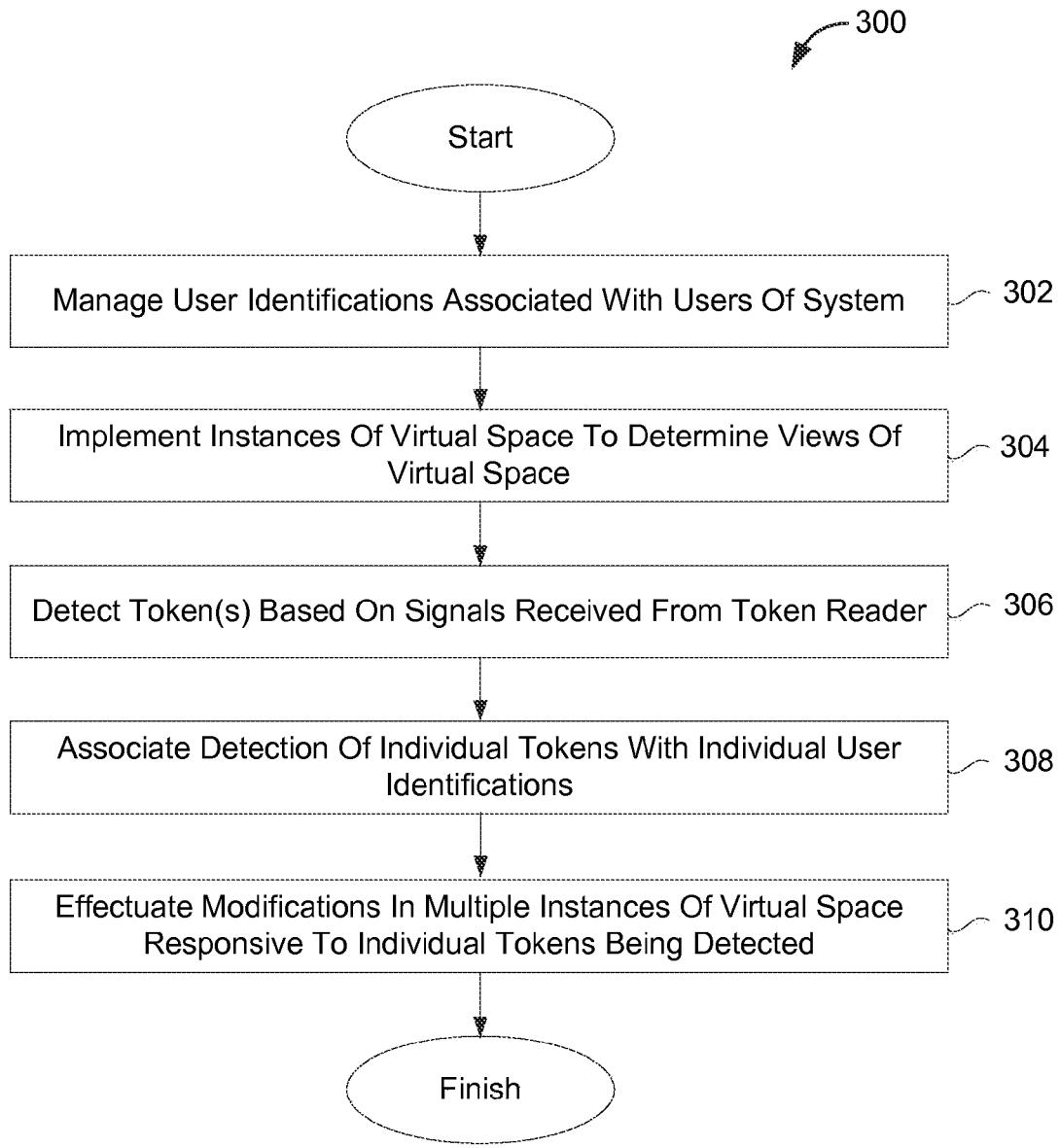
FIG. 3 illustrates a method for linking token detection at a single computing platform with a user identification to effectuate modifications in virtual space instances presented via multiple computing platforms, in accordance with one or more implementations.

FIG. 2 illustrates a method 200 and FIG. 3 illustrates a method 300, in accordance with one or more implementations. The operations of method 200 and/or method 300 presented below are intended to be illustrative. In some implementations, method 200 and/or method 300 may be accomplished with one or more additional operations not described, and/or without one or more of the operations discussed. Additionally, the order in which the operations of method 200 and/or method 300 are respectively illustrated in FIG. 2 and/or FIG. 3 and described below is not intended to be limiting.

In some implementations, method 200 and/or method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 and/or method 300 in response to instructions stored electronically on an electronic storage medium. The one or more processing devices may include one or more devices configured through hardware, firmware, and/or software to be specifically designed for execution of one or more of the operations of method 200 and/or method 300.

The method 200, illustrated in FIG. 2, is for linking token detection at a single computing platform with a user identification to unlock content in virtual space instances presented via multiple computing platforms, in accordance with one or more implementations.

At an operation 202, user identifications associated with users of the system may be managed. The user identifications may include a first user identification associated with a first user. Operation 202 may be performed by a user module that is the same as or similar to user module 108, in accordance with one or more implementations.

At an operation 204, instances of a virtual space may be implemented to determine views of the virtual space. The instances of the virtual space may include a first instance and a second instance. Both the first instance and the second instance may be associated with the first user identification. The first instance may be configured for presentation via a first computing platform and the second instance may be configured for presentation via a second computing platform. Operation 204 may be performed by a space module that is the same as or similar to space module 110, in accordance with one or more implementations.

At an operation 206, one or more tokens may be detected based on signals received from a token reader. The token reader may be communicatively coupled with the first computing platform. A given token may be a standalone physical object. The one or more tokens may include a first token. The first token may be detectable based on a first signal conveying information associated with the first token. Operation 206 may be performed by a token detection module that is the same as or similar to token detection module 112, in accordance with one or more implementations.

At an operation 208, detection of individual tokens may be associated with individual user identifications. Detection of the first token may be associated with the first user identification responsive to the first signal being received from the token reader communicatively coupled with the first computing platform. Operation 208 may be performed by a user ID linking module that is the same as or similar to user ID linking module 114, in accordance with one or more implementations.

At an operation 210, content may be unlocked in the virtual space responsive to individual tokens being detected. Previously locked content may become accessible in the virtual space responsive to being unlocked. The content may include first content configured to be unlocked responsive to the association between the detection of the first token and the first user identification. The unlocked first content may be accessible in both the first instance via the first computing platform and the second instance via the second computing platform. The first content may include one or both of (1) a first character or (2) a first virtual item. Operation 210 may be performed by a content unlocking module that is the same as or similar to content unlocking module 116, in accordance with one or more implementations.

The method 300, illustrated in FIG. 3, is for linking token detection at a single computing platform with a user identification to effectuate modifications in virtual space instances presented via multiple computing platforms, in accordance with one or more implementations.

At an operation 302, user identifications associated with users of the system may be managed. The user identifications may include a first user identification associated with a first user. Operation 302 may be performed by a user module that is the same as or similar to user module 108, in accordance with one or more implementations.

At an operation 304, instances of a virtual space may be implemented to determine views of the virtual space. The instances of the virtual space may include a first instance and a second instance. Both the first instance and the second instance may be associated with the first user identification. The first instance may be configured for presentation via a first computing platform and the second instance may be configured for presentation via a second computing platform. Operation 304 may be performed by a space module that is the same as or similar to space module 110, in accordance with one or more implementations.

At an operation 306, one or more tokens may be detected based on signals received from a token reader. The token reader may be communicatively coupled with the first computing platform. A given token may be a standalone physical object. The one or more tokens may include a first token. The first token may be detectable based on a first signal conveying information associated with the first token. Operation 306 may be performed by a token detection module that is the same as or similar to token detection module 112, in accordance with one or more implementations.

At an operation 308, detection of individual tokens may be associated with individual user identifications. Detection of the first token may be associated with the first user identification responsive to the first signal being received from the token reader communicatively coupled with the first computing platform. Operation 308 may be performed by a user ID linking module that is the same as or similar to user ID linking module 114, in accordance with one or more implementations.

At an operation 310, modifications may be effectuated in the virtual space responsive to individual tokens being detected. The modifications may include a first modification configured to be made responsive to the association between the detection of the first token and the first user identification. The first modification may be observable in both the first instance via the first computing platform and the second instance via the second computing platform. The first modification may include one or more of (1) a modification to a first character, (2) a modification to a first virtual item, or (3) a modification to one or more aspects of the virtual space. Operation 310 may be performed by a space modification module that is the same as or similar to space modification module 118, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to link token detection at a single computing platform with a user identification to effectuate modifications in virtual space instances presented via multiple computing platforms, the system comprising;
    one or more hardware processors configured by computer readable instructions to:
        manage user identifications associated with users of the system, the user identifications including a first user identification associated with a first user;

implement instances of a virtual space to determine views of the virtual space for presentation via computing platforms associated with the users, the instances of the virtual space including a first instance and a second instance, both the first instance and the second instance being associated with the first user identification, the first instance being configured for presentation via a first computing platform, the second instance being configured for presentation via a second computing platform, both the first computing platform and the second computing platform being associated with the first user identification, the first computing platform being configured to facilitate communicative coupling with a token reader, the second computing platform lacking capability to communicatively couple with the token reader;

effectuate communication of information defining the determined views of the virtual space to the computing platforms for presentation of the views on the computing platforms, the views of the virtual space including virtual space content, such that determined views of the first instance of the virtual space are communicated to the first computing platform, and the determined views of the second instance of the virtual space are communicated to the second computing platform, wherein the views of both the first instance and the second instance of the virtual space include a first character controlled by the first user and/or a first virtual item used by the first user;

detect physical tokens based on signals received from the token reader, the token reader being communicatively coupled with the first computing platform, a given physical token being a standalone physical object, the physical tokens including a first token, the first token being detectable based on a first signal conveying information associated with the first token;

associate detection of individual physical tokens with individual user identifications, detection of the first token being associated with the first user identification responsive to the first signal being received from the token reader communicatively coupled with the first computing platform; and effectuate modifications to virtual space content present in the views of the virtual space responsive to individual physical tokens being detected, the modifications including a first modification configured to be made responsive to the association between the detection of the first token and the first user identification, the first modification being observable in both the first instance via the first computing platform and the second instance via the second computing platform, the first modification including one or both of a modification to the first character or a modification to the first virtual item.

2. The system of claim 1, wherein the instances of the virtual space further include a third instance associated with the first user identification, the third instance being configured for presentation via a third computing platform associated with the first user identification, and wherein the first modification is observable in the third instance via the third computing platform.

3. The system of claim 1, wherein the first computing platform is a stationary computing platform and the second computing platform is a mobile computing platform.

4. The system of claim 1, wherein the first token is configured to depict one or both of the first character or the first virtual item.

5. The system of claim 1, wherein the first modification is the modification to the first character, the modification to the first character including a modification to one or more of a behavior of the first character, an ability of the first character, an appearance of the first character, or a relationship of the first character.

6. The system of claim 1, wherein the first modification is the modification to the first virtual item, the modification to the first virtual item including a modification to one or more of a function of the first virtual item, an effectiveness of the first virtual item, or an appearance of the first virtual item.

7. The system of claim 1, wherein the one or more hardware processors are further configured by computer readable instructions to provide a virtual item repository within the virtual space, the virtual item repository being configured to provide access by a plurality of characters to a plurality of virtual items, the plurality of characters including the first character and the plurality of virtual items including the first virtual item.

8. A system configured to link token detection at a single computing platform with a user identification to effectuate modifications in virtual space instances presented via multiple computing platforms, the system comprising:

one or more hardware processors configured by computer readable instructions to:

manage user identifications associated with users of the system, the user identifications including a first user identification associated with a first user;

implement instances of a virtual space to determine views of the virtual space for presentation via computing platforms associated with the users, the instances of the virtual space including a first instance and a second instance, both the first instance and the second instance being associated with the first user identification, the first instance being configured for presentation via a first computing platform, the second instance being configured for presentation via a second computing platform, both the first computing platform and the second computing platform being associated with the first user identification, the first computing platform being configured to facilitate communicative coupling with a token reader, the second computing platform lacking capability to communicatively couple with the token reader;

effectuate communication of information defining the determined views of the virtual space to the computing platforms for presentation of the views on the computing platforms, the views of the virtual space including virtual space content, such that determined views of the first instance of the virtual space are communicated to the first computing platform, and the determined views of the second instance of the virtual space are communicated to the second computing platform, wherein the views of both the first instance and the second instance of the virtual space include a first set of virtual space content observable the first user;

detect physical tokens based on signals received from the token reader, the token reader being communicatively coupled with the first computing platform, a given physical token being a standalone physical object, the physical tokens including a first token, the first token being detectable based on a first signal conveying information associated with the first token;

associate detection of individual physical tokens with individual user identifications, detection of the first token being associated with the first user identification responsive to the first signal being received from the token reader communicatively coupled with the first computing platform; and effectuate modifications to the virtual space content present in the views of the virtual space responsive to individual physical tokens being detected, the modifications including a first modification configured to be made responsive to the association between the detection of the first token and the first user identification, the first modification being observable in both the first instance via the first computing platform and the second instance via the second computing platform, the first modification including a modification to one or more aspects of the first set of virtual space content present in the views of both the first instance and the second instance of the virtual space.

9. The system of claim 8, wherein the one or more aspects of the first set of virtual space content include objectives associated with the virtual space, a given objective being a purpose or goal that efforts or actions within the virtual space are intended to attain or accomplish.

10. The system of claim 8, wherein the one or more aspects of the first set of virtual space content include a theme of the virtual space, the theme of the virtual space being a unifying subject associated with the virtual space.

11. A computer-implemented method to link token detection at a single computing platform with a user identification to effectuate modifications in virtual space instances presented via multiple computing platforms, the method being performed by one or more processors configured by computer readable instructions, the method comprising:

managing, at the one or more processors, user identifications associated with users of the system, the user identifications including a first user identification associated with a first user;

implementing, at the one or more processors, instances of a virtual space to determine views of the virtual space for presentation via computing platforms associated with the users, the instances of the virtual space including a first instance and a second instance, both the first instance and the second instance being associated with the first user identification, the first instance being configured for presentation via a first computing platform, the second instance being configured for presentation via a second computing platform, both the first computing platform and the second computing platform being associated with the first user identification, the first computing platform being configured to facilitate communicative coupling with a token reader, the second computing platform lacking capability to communicatively couple with the token reader;

effectuating, at the one or more processors, communication of information defining the determined views of the virtual space to the computing platforms for presentation of the views on the computing platforms, the views of the virtual space including virtual space content, including communicating determined views of the first instance of the virtual space to the first computing platform, and the determined views of the second instance of the virtual space to the second computing platform, wherein the views of both the first instance and the second instance of the virtual space include a first character controlled by the first user and/or a first virtual item used by the first user;

detecting, at the one or more processors, physical tokens based on signals received from the token reader, the token reader being communicatively coupled with the first computing platform, a given physical token being a standalone physical object, the physical tokens including a first token, the first token being detectable based on a first signal conveying information associated with the first token;

associating, at the one or more processors, detection of individual physical tokens with individual user identifications, detection of the first token being associated with the first user identification responsive to the first signal being received from the token reader communicatively coupled with the first computing platform; and effectuating, at the one or more processors, modifications to the virtual space content in the views of the virtual space responsive to individual physical tokens being detected, the modifications including a first modification configured to be made responsive to the association between the detection of the first token and the first user identification, the first modification being observable in both the first instance via the first computing platform and the second instance via the second computing platform, the first modification including one or both of a modification to the first character or a modification to the first virtual item.

12. The method of claim 11, wherein the instances of the virtual space further include a third instance associated with the first user identification, the third instance being configured for presentation via a third computing platform, and wherein the first modification is observable in the third instance via the third computing platform.

13. The method of claim 11, wherein the first computing platform is a stationary computing platform and the second computing platform is a mobile computing platform.

14. The method of claim 11, wherein the first token is configured to depict one or both of the first character or the first virtual item.

15. The method of claim 11, wherein the first modification is the modification to the first character, the modification to the first character including a modification to one or more of a behavior of the first character, an ability of the first character, an appearance of the first character, or a relationship of the first character.

16. The method of claim 11, wherein the first modification is the modification to the first virtual item, the modification to the first virtual item including a modification to one or more of a function of the first virtual item, an effectiveness of the first virtual item, or an appearance of the first virtual item.

17. The method of claim 11, further comprising providing a virtual item repository within the virtual space, the virtual item repository being configured to provide access by a plurality of characters to a plurality of virtual items, the plurality of characters including the first character and the plurality of virtual items including the first virtual item.

18. A computer-implemented method to link token detection at a single computing platform with a user identification to effectuate modifications in virtual space instances presented via multiple computing platforms, the method being performed by one or more processors configured by computer readable instructions, the method comprising:

managing, at the one or more processors, user identifications associated with users of the system, the user identifications including a first user identification associated with a first user;

implementing, at the one or more processors, instances of a virtual space to determine views of the virtual space for presentation via computing platforms associated with the users, the instances of the virtual space including a first instance and a second instance, both the first instance and the second instance being associated with the first user identification, the first instance being configured for presentation via a first computing platform, the second instance being configured for presentation via a second computing platform, both the first computing platform and the second computing platform being associated with the first user identification, the first computing platform being configured to facilitate communicative coupling with a token reader, the second computing platform lacking capability to communicatively couple with the token reader;

effectuating, at the one or more processors, communication of information defining the determined views of the virtual space to the computing platforms for presentation of the views on the computing platforms, the views of the virtual space including virtual space content, such that determined views of the first instance of the virtual space are communicated to the first computing platform, and the determined views of the second instance of the virtual space are communicated to the second computing platform, wherein the views of both the first instance and the second instance of the virtual space include a first set of virtual space content observable the first user;

detecting, at the one or more processors, physical tokens based on signals received from the token reader, the token reader being communicatively coupled with the first computing platform, a given physical token being a standalone physical object, the physical tokens including a first token, the first token being detectable based on a first signal conveying information associated with the first token;

associating, at the one or more processors, detection of individual physical tokens with individual user identifications, detection of the first token being associated with the first user identification responsive to the first signal being received from the token reader communicatively coupled with the first computing platform; and effectuating, at the one or more processors, modifications in the virtual space responsive to individual physical tokens being detected, the modifications including a first modification configured to be made responsive to the association between the detection of the first token and the first user identification, the first modification being observable in both the first instance via the first computing platform and the second instance via the second computing platform, the first modification including a modification to one or more aspects of the first set of virtual space content present in the views of both the first instance and the second instance of the virtual space.

19. The method of claim 18, wherein the one or more aspects of the first set of virtual space content include objectives associated with the virtual space, a given objective being a purpose or goal that efforts or actions within the virtual space are intended to attain or accomplish.

20. The method of claim 18, wherein the one or more aspects of the first set of virtual space content include a theme of the virtual space, the theme of the virtual space being a unifying subject associated with the virtual space.

* * * * *